United States Patent
Johansen et al.

(10) Patent No.: US 9,136,548 B2
(45) Date of Patent: Sep. 15, 2015

(54) METHOD FOR OPERATING A FUEL CELL AND A FUEL CELL ARRANGEMENT

(75) Inventors: Lars Johansen, Dröbak (NO); Peter Jozsa Mårdberg, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 1578 days.

(21) Appl. No.: 12/670,416

(22) PCT Filed: Jul. 27, 2007

(86) PCT No.: PCT/SE2007/000700
§ 371 (c)(1),
(2), (4) Date: Sep. 15, 2010

(87) PCT Pub. No.: WO2009/017439
PCT Pub. Date: Feb. 5, 2009

(65) Prior Publication Data
US 2011/0053023 A1    Mar. 3, 2011

(51) Int. Cl.
*H01M 8/04*    (2006.01)
*H01M 8/02*    (2006.01)
*H01M 8/12*    (2006.01)

(52) U.S. Cl.
CPC ...... *H01M 8/04701* (2013.01); *H01M 8/04111* (2013.01); *H01M 8/04268* (2013.01); *H01M 8/04753* (2013.01); *H01M 8/04776* (2013.01); *H01M 2008/1293* (2013.01); *Y02E 60/50* (2013.01); *Y02E 60/525* (2013.01)

(58) Field of Classification Search
CPC ...................... H01M 8/04037; H01M 8/04268
USPC .................................................. 429/428–451
See application file for complete search history.

(56) References Cited

U.S. PATENT DOCUMENTS

| | | | |
|---|---|---|---|
| 5,401,589 A | 3/1995 | Palmer et al. | |
| 5,753,383 A | 5/1998 | Cargnelli et al. | |
| 6,124,053 A | 9/2000 | Bernard et al. | |
| 6,365,289 B1 | 4/2002 | Lee et al. | |

(Continued)

FOREIGN PATENT DOCUMENTS

| | | |
|---|---|---|
| DE | 10325452 A1 | 12/2004 |
| JP | 2001351665 A | 12/2001 |

OTHER PUBLICATIONS

Supplementary European Search Report for corresponding European App. EP 07 76 9007.

(Continued)

*Primary Examiner* — Basia Ridley
*Assistant Examiner* — Caitlin Wilmot
(74) *Attorney, Agent, or Firm* — WRB-IP LLP

(57) ABSTRACT

A method for operating, especially for starting, a fuel cell such as a solid oxide fuel cell (SOFC) is disclosed which method includes a starting operation with a first or initial start phase and an optional second or intermediate start phase which is initiated when the fuel cell has reached a predetermined medium temperature below a steady state operational temperature range, before a steady state operation is activated. During the first or initial start phase fuel is subjected to an exothermic reaction with oxygen in a burner unit and output gases from the burner unit are used to warm up and passively heat the fuel cell. Furthermore, a fuel cell arrangement comprising a fuel cell, especially a SOFC hybrid system, for conducting this method is disclosed.

27 Claims, 4 Drawing Sheets

(56) References Cited

U.S. PATENT DOCUMENTS

| | | |
|---|---|---|
| 6,485,852 B1 | 11/2002 | Miller et al. |
| 2004/0038095 A1 | 2/2004 | Kushibiki et al. |
| 2004/0058230 A1 | 3/2004 | Hsu |
| 2005/0123808 A1 | 6/2005 | Draper et al. |
| 2005/0164051 A1 | 7/2005 | Venkataraman et al. |
| 2006/0134480 A1* | 6/2006 | Beasley et al. .................. 429/22 |
| 2007/0202366 A1* | 8/2007 | Kim et al. ...................... 429/13 |

OTHER PUBLICATIONS

International Search Report for corresponding International Application PCT/SE2007/000700.

International Preliminaly Report on Patentability for corresponding International Application PCT/SE2007/000700.

* cited by examiner

METHOD FOR OPERATING A FUEL CELL AND A FUEL CELL ARRANGEMENT

BACKGROUND AND SUMMARY

The invention relates to a method for operating, especially for starting, a fuel cell like especially a solid oxide fuel cell (SOFC). The invention further relates to a fuel cell arrangement comprising such a fuel cell, especially a SOFC hybrid system, for conducting this method.

Solid oxide fuel cells are used to convert fuel, such as hydrogen or a hydrogen rich compound, and oxygen to electric power, heat and hot output gases. The fuel is fed to an anode compartment of the fuel cell and oxygen is supplied by ambient or compressed air to a cathode compartment of the fuel cell.

Such a fuel cell is very vulnerable to internal temperature gradients which espedally occur during the start up procedure due to different thermal expansion properties of the different materials within the fuel cell.

JP 2001351665 discloses a composite electric generator and a method for starting such a generator, wherein the composite electric generator is composed of a gas turbine and a solid electrode fuel cell. An exhaust line of the gas turbine is fed through a combustion support burner; a pre-heater and a vapour generator in order to preheat the fuel and air which is supplied to the fuel cell. By this, a large temperature gradient at the fuel reformer at the start of the composite electric generator shall be prevented.

It is desirable to provide an improved method for operating a fuel cell as mentioned in the introductory part above especially during the start phase such that the temperature gradients which occur during the start phase are minimized, the risk of a premature damage of the fuel cell is decreased and the lifetime of the fuel cell is increased.

Another object underlying the invention is to provide a fuel cell arrangement comprising such a fuel cell which fuel cell arrangement is adapted for conducting the above method in an efficient manner.

By a method and arrangement according to aspects of the present invention, the problem of starting up a fuel cell (especially a SOFC) can be solved in a way which will not be destructive for the components of the fuel cell. The lifetime and the performance of the whole fuel cell hybrid arrangement can be prolonged. Furthermore, the lifetime of the catalyst of the fuel cell can also be prolonged due to the fact that less exothermic conditions occur at the start up procedure in comparison to known solutions. Finally, according to an aspect of the invention the option can be provided that the fuel cell hybrid arrangement can supply power by means of the turbine unit during the start up procedure.

It will be appreciated that features of the invention are susceptible to being combined in any combination without departing from the scope of the invention as defined by the accompanying claims.

BRIEF DESCRIPTION OF THE DRAWINGS

Further details, features and advantages of the invention will become apparent from the following description of exemplary and preferred embodiments of the invention in connection with the drawings, in which shows.

DETAILED DESCRIPTION

For ease of explanation, FIGS. 1 to 4 substantially show only those pipes, lines and components which are used, needed or activated during that specific operation phase described in connection with the Figure concerned.

Furthermore, pipes and lines of the fuel cell hybrid arrangement are indicated with small letters a, b, c, . . . , units and components are indicated with numbers 1, 2, 3, . . . and external feeds are indicated with capital letters A, B, C, . . . . Throughout the FIGS. 1 to 4, any reference numbers or characters are always referring to the same pipe, line, components or external feeds, as the case may be.

Figure 1:
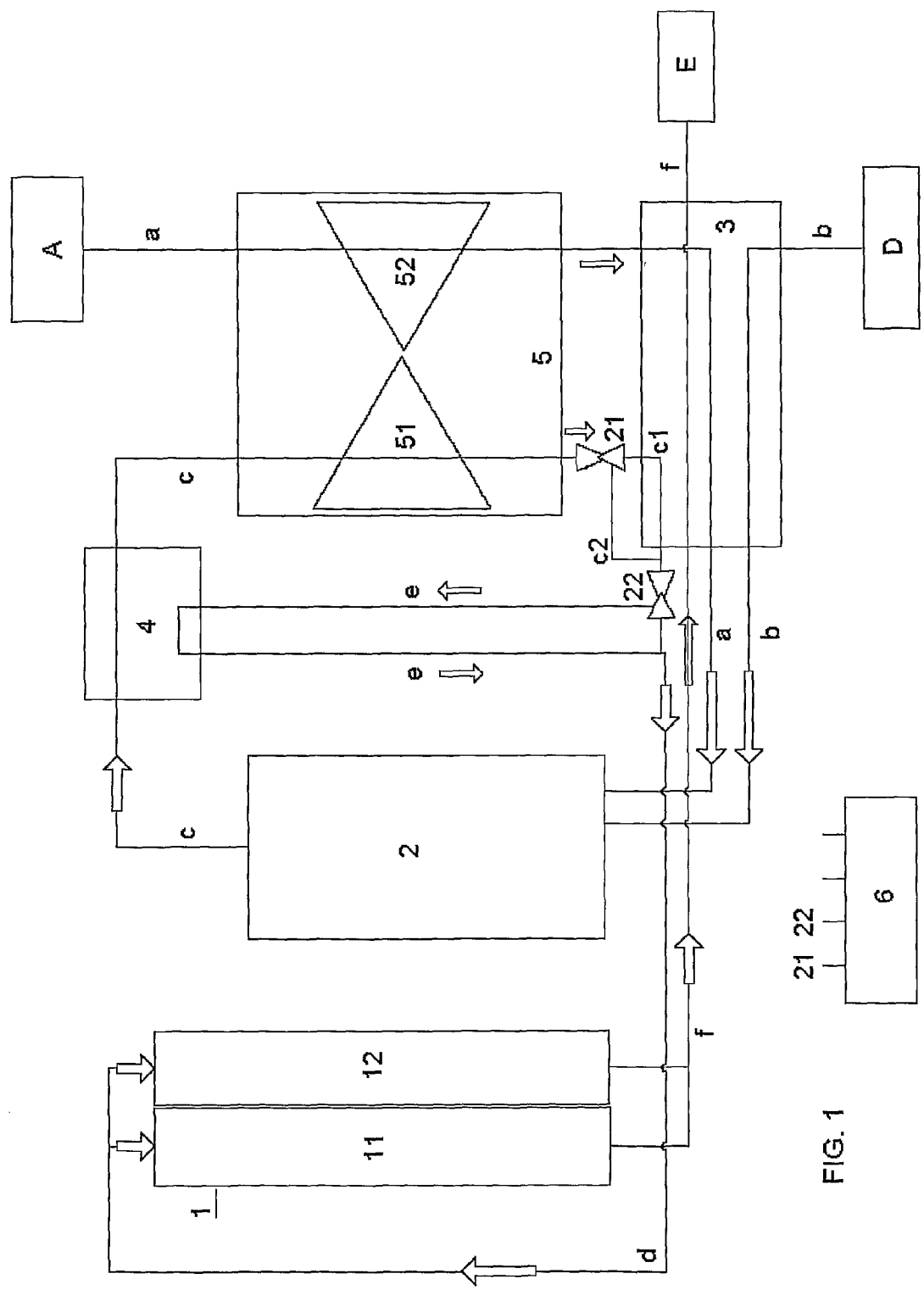
FIG. 1 a schematic block diagram of a fuel cell hybrid arrangement according to a first embodiment of the invention for conducting a first embodiment of the method according to the invention during an initial or first start phase.

FIG. 1 shows a schematic block diagram of a fuel cell hybrid arrangement according to a preferred and exemplary first embodiment of the invention.

This fuel cell hybrid arrangement comprises a fuel cell 1, preferably in the form of a solid oxide fuel cell (SOFC), comprising a cathode compartment 11 and an anode compartment 12. The fuel cell hybrid arrangement further comprises a burner unit 2 (which can be a conventional burner unit or a catalytic burner unit), a first heat exchanger 3, a second heat exchanger 4 and a turbine unit 5 which includes an expander 51 and a compressor 52. Furthermore, a plurality of pipes or lines a to f and a first and a second valve 21, 22 are provided for connecting these units and components 1 to 5 with each other according to the explanations below.

An electronic control unit (ECU) 6 is used for operating or controlling the first and the second valve 21, 22 each of which via a corresponding output terminal which is denoted with the same reference number 21, 22 as the first and the second valve 21, 22, respectively, which is connected with said output terminal 21, 22, respectively. However, for clarity reasons only, the connections themselves between the ECU 6 and the first and the second valve 21, 22 via the output terminals 21, 22 of the ECU 6 are omitted in the Figure. The same applies correspondingly for the control units 6 and output terminals shown in FIGS. 2 to 4 and the related valves indicated in these Figures.

Finally, an air feed A, a fuel feed D and an exhaust E are schematically indicated.

The fuel cell 1 (SOFC) is used to convert fuel and oxygen to electric power, heat and hot output gases. Preferably hydrogen or hydrogen rich fuel such as e.g. dimethyl ether (DME) is used as fuel, however, any hydrocarbons (as e.g. alkanes), preferably hydrocarbons in the groups C1 to C4 (i.e. in the groups of molecules containing 1 to 4 C-atoms), but also those hydrocarbons having more than 4 Catoms, any alcohols, preferably alcohols in the groups C1 to C4, and any ether, preferably ether in the groups C1 to C4 are suitable for use in a fuel cell hybrid arrangement according to the invention as well. Generally, hydrogen and hydrocarbons in the groups C1 to C4 have the highest efficiency and are mostly preferred.

In the steady state, the fuel is supplied via the fuel feed D to the fuel cell hybrid arrangement. Oxygen is usually supplied by ambient air via the air feed A to the fuel cell hybrid arrangement. The exhaust gases are released via the exhaust E from the fuel cell hybrid arrangement.

Generally, and in a steady state, the fuel as mentioned above can either be converted directly by an anodic reaction of the fuel cell 1, or the fuel, if it is not pure hydrogen, is first converted in a primary reaction step by means of a separate and first (or upper) catalytic layer on the anode catalyst to a gas mixture containing hydrogen and carbon monoxide and then subjected to the (secondary) anodic reaction by means of a second catalytic layer on the anode catalyst of the fuel cell 1.

The gas mixture may contain also methane and carbon dioxide and other substances as reaction products from this primary reaction step. The primary reaction step can comprise both endothermic and exothermic partial reactions. Furthermore, air and water can be used to control these reactions in the first catalytic layer. The reaction products of this first or primary reaction step, if utilized, will be the fuel for the electrochemical reactions at the anode of the fuel cell 1 during the secondary reaction step by means of the second catalytic layer on the anode catalyst of the fuel cell 1.

The output gases of the fuel cell 1 comprise often substances which can be burned in the burner unit 2. These gases may be unconverted hydrogen or the primary fuel or reaction products of the reaction occurring in the first and second catalytic layer in the anode compartment of the fuel cell 1. The hot output gases from the burner unit 2 can be passed to the expander 51 of the turbine unit 5 that interacts with the compressor 52 for compressing air which is supplied in the steady state operation from the air feed A to the cathode compartment 11 of the fuel cell 1. Electric power can be generated by means of the expander 51 in the turbine unit 5.

As mentioned in the introductory part above, a solid oxide fuel cell is typically very vulnerable to internal temperature gradients because it comprises several different materials which have different thermal expansion properties. Such internal temperature gradients can especially occur to a considerable extent during the starting operation of the fuel cell hybrid arrangement, i.e. during the time between switching-on the fuel cell hybrid arrangement and the steady state operation of the fuel cell hybrid arrangement, in which the fuel cell is usually operated at temperatures in the range between e.g. about 650° C. and about 800° C.

In order to avoid or decrease such detrimental internal temperature gradients, the starting operation of the fuel cell hybrid arrangement according to the invention is operated in accordance with the method according to the invention which method comprises a first or initial start phase and preferably a second subsequent or intermediate start phase, before the steady state operation is activated.

FIG. 1 shows a first embodiment of the method according to the invention during a first or initial start phase, which starts when switching-on the fuel cell hybrid arrangement and which is explained in the following.

Substantially, the first or initial start phase is provided for subjecting fuel to an exothermic reaction with oxygen in the burner unit 2 (which preferably is a catalytic burner unit or a conventional burner unit) in order to warm up and passively heat the fuel cell 1 by means of the heat of the output gases from the burner unit 2.

More in detail, during the first or initial start phase air is supplied from the air feed A via a first line a which leads through the compressor 52 of the turbine unit 5, in which it is compressed, and through the first heat exchanger 3 for receiving heat into a first input of the burner unit 2. Furthermore, fuel (preferably DME, see above) is supplied from the fuel feed D via a second line b through the first heat exchanger 3 for receiving heat into a second input of the burner unit 2.

In case of using a catalytic burner unit 2 which requires preheated fuel and air at its input, preferably an additional unit, for example in the form of a conventional burner unit or an electrical heating unit (not indicated in the Figures) is provided for heating either the first heat exchanger 3 and/or directly the fuel and air before it is supplied to the catalytic burner unit 2 during a phase at the beginning of the first or initial start phase during which the first heat exchanger 3 is not sufficiently heated by the output gases of the fuel cell 1 or by the output gases of the burner unit 2, so that during this phase the fuel and air cannot be sufficiently heated by the first heat exchanger 3 alone.

In case of not using a catalytic burner unit 2 but a usual or conventional burner unit 2, the air and fuel fed to the burner unit 2 would usually not need to be preheated.

Within the burner unit 2, the fuel is subjected to an exothermic reaction with oxygen from the supplied air, and hot output gases from the burner unit 2 are fed via a third line c through the second heat exchanger 4 for releasing heat and then into the expander 51 of the turbine unit 5 for operating the compressor 52 for compressing the air and for generating electric power during the first or initial start phase.

The heat of the output gases from the expander 51 of the turbine unit 5 is used to uniformly warm up and passively heat the fuel cell 1 by passing these gases through the anode compartment 11 and/or the cathode compartment 12 in at least one of the following four variations. These variations can also be combined with each other and can either be selected prior to starting the first or initial start phase and/or they can be changed and/or selected during the conduction of the first or initial start phase as required for providing the necessary heat to the fuel cell 1.

According to a first variation, the output gases are fed from the output of the turbine 5 (i.e. the expander 51) through the first valve 21 via a first section c1 of the third line c through the first heat exchanger 3 for releasing heat to the compressed air (line a) and/or to the fuel (line b), and through the second valve 22 via the fourth line d directly (i.e. circumventing the second heat exchanger 4) into the cathode compartment 11 and/or the anode compartment 12 of the fuel cell 1.

According to a second variation, the output gases are fed from the output of the turbine 5 (i.e. the expander 51) through the first valve 21 via a second section c2 of the third line c directly to the second valve 22 (i.e. circumventing the first heat exchanger 3) and then via the fifth line e through the second heat exchanger 4 for receiving heat from the output gases of the burner unit 2 (line c), and via the fourth line d into at least one of the compartments 11, 12 of the fuel cell 1.

According to a third variation, the output gases are fed from the output of the turbine 5 (i.e. the expander 51) through the first valve 21 via the second section c2 of the third line c directly through the second valve 22 and the fourth line d directly (i.e. circumventing the first and the second heat exchanger 3, 4) into at least one of the compartments 11, 12 of the fuel cell 1. This variation is especially useful if the burner unit 2 is a conventional but not a catalytic burner unit 2.

According to a fourth variation, the output gases are fed from the output of the turbine 5 (i.e. the expander 51) through the first valve 21 via the first section d of the third line c through the first heat exchanger 3 for releasing heat to the compressed air (line a) and/or to the fuel (line b), and then via the second valve 22 and the fifth line e through the second heat exchanger 4 for receiving heat from the output gases of the burner unit 2 (line c), and via the fourth line d into at least one of the compartments 11, 12 of the fuel cell 1.

By at least one of these variations which is/are activated by controlling the valves 21, 22 by means of the control unit 6 accordingly, the fuel cell 1 is warmed up uniformly in the whole unit and to a predetermined temperature, so that the heating of the fuel cell 1 is not conducted by the electrochemical reaction between oxygen and hydrogen within the fuel cell 1, but by means of the hot output gases of the burner unit 2. (Only if the output gases of the burner unit 2 contain unburned fuel which reaches the fuel cell 1, then a corresponding electrochemical reaction can take place within the fuel cell 1 which contributes to the warming up of the fuel cell 1, however, this is usually an unwanted reaction during the first or initial start phase).

The output gases from the cathode compartment 11 and/or the anode compartment 12 of the fuel cell 1 are fed via the sixth line f through the first heat exchanger 3 for releasing heat to the compressed air and to the supplied fuel, before the output gases reach the exhaust E.

The first and the second valve 21, 22 is controlled by means of the electronic control unit 6. The related output of this control unit 6 which is connected with the related valve is (as explained above) denoted with the same reference number 21, 22 as the related valve.

As mentioned above, the selection of at least one of the above four variations can either be made before starting the first or initial start phase, and/or during the conduction of the first or initial start phase, depending for example on the heat of the output gases which is released within the expander 51 and/or the heat of the output gases which is necessary for a warming up the fuel cell 1 appropriately.

Figure 2:
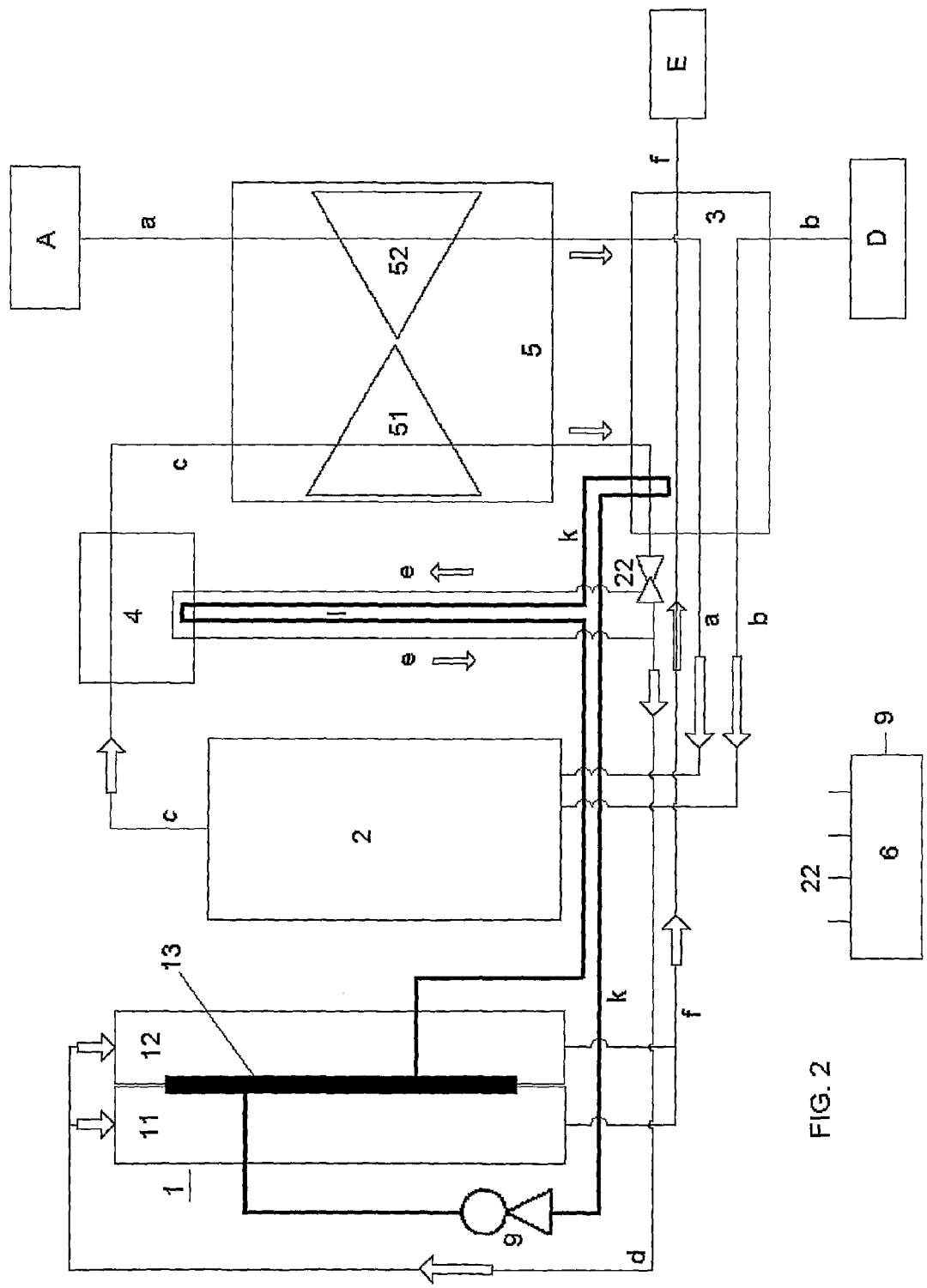
FIG. 2 a schematic block diagram of a fuel cell hybrid arrangement according to a second embodiment of the invention for conducting a second embodiment of the method according to the invention during an initial or first start phase.

FIG. 2 shows a schematic block diagram of a fuel cell hybrid arrangement according to a second embodiment of the invention for conducting a second embodiment of the method according to the invention during the start or initial phase. The same units, components and lines as in the first embodiment according to FIG. 1 are denoted with the same reference numbers and characters, respectively, so that with respect to the function of these units, components and lines, reference is made to the above explanations of FIG. 1. Only for the sake of clarity, the first and the second section c1, c2 of the third line c and the first valve 21 are not indicated in FIG. 2.

The substantial difference between the first and the second embodiment of the invention according to the FIGS. 1 and 2 is, that the fuel cell hybrid arrangement according to FIG. 2 is provided with an additional heat transportation system generally comprising channels or pipes and manifolds which are passed through the first and/or the second heat exchanger 3, 4 for receiving heat and which are passed through a separate heating chamber or compartment 13 within the fuel cell 1, preferably next to the anode, for releasing heat and additionally heating-up the fuel cell 1.

According to FIG. 2, exemplarily a seventh line k and an eighth line I (the latter line I connecting the second heat exchanger 4 to the additional heat transportation system) as well as a pump unit 9 for conveying a heat exchange fluid or coolant medium through the lines k, I and through the cooling chamber or compartment 13 (only schematically indicated) is provided, wherein the seventh line k receives heat from the first heat exchanger 3 and/or the eighth line I receives heat from the second heat exchanger 4 by feeding each these lines k, I through the first and the second heat exchanger 3, 4, respectively.

Additionally, the connection between the seventh line k and the eighth line I can be provided with a switch-over valve (not indicated), so that the coolant medium can be selectively conveyed either only through the first heat exchanger 3, or through the first and the second heat exchanger 3, 4.

Other configurations can of course be realized as well, in which for example the coolant medium is only fed through the second heat exchanger 4, but not through the first heat exchanger 3.

Further, the operation of the additional heat transportation system of FIG. 2 can be combined with the heating operation variations or combinations or sequences thereof as described in connection with the embodiments of FIGS. 1 and 3.

This additional heat transportation system k, I, 9, 13 can be activated under certain circumstances or environmental conditions automatically or by a driver of a vehicle incorporating such fuel cell hybrid arrangement or an operator of such fuel cell hybrid arrangement. Preferably, the electronic control unit 6 is provided for activating and operating this heat transportation system, especially the pump unit 9, as well. Therefore, as indicated in FIG. 2, the pump unit 9 is also connected with the electronic control unit 6 via a corresponding out terminal of the electronic control unit 6 with the same reference number 9. The same applies for the above mentioned switch-over valve (not shown).

Figure 3:
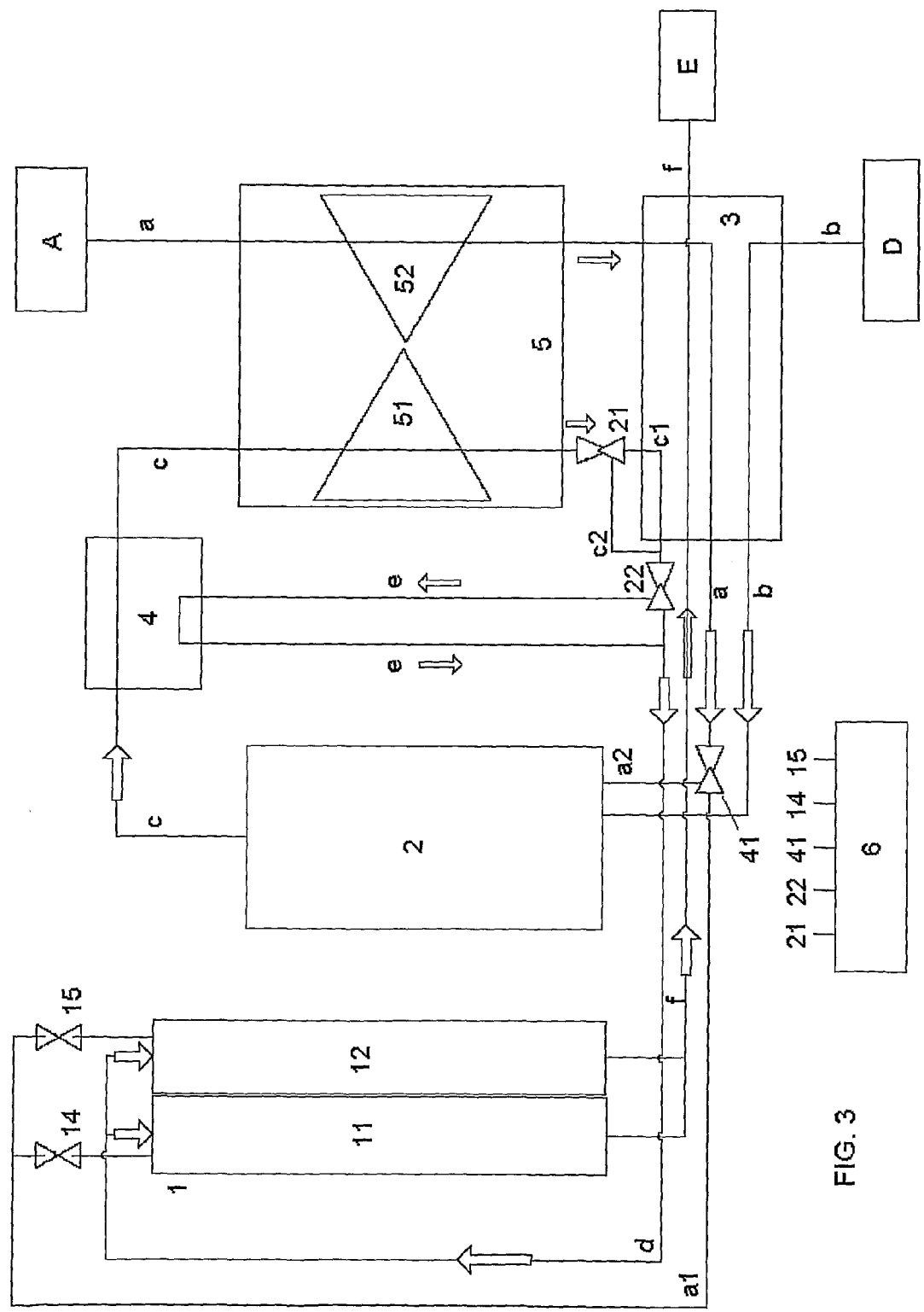
FIG. 3 a schematic block diagram of the fuel cell hybrid arrangement according to the first embodiment of the invention of FIG. 1 for conducting the method according to the invention during an intermediate or subsequent second start phase.

FIG. 3 shows a schematic block diagram of the fuel cell hybrid arrangement according to the first embodiment of invention as indicated in FIG. 1 for explaining the second or intermediate start phase of the starting operation according to the invention which is an optional phase and which preferably follows the first or initial start phase according to FIG. 1 or 2, especially if hydrogen is used as the fuel, before the steady state operation (FIG. 4) is activated. By this (optional) second or intermediate start phase, on the one hand, the whole start up phase is accelerated, and on the other hand, the risk of a damage of the catalyst within the fuel cell 1 due to a premature start of the steady state operation is further reduced.

The same units, components and lines as in the first embodiment according to FIG. 1 are again denoted with the same reference numbers and characters, respectively, so that with respect to the functions of these units, components and lines, reference is made to the above explanations.

The substantial difference between the first or initial start phase according to FIG. 1 or 2 and the second or intermediate start phase according to FIG. 3 is, that oxygen in the form of compressed air is not only supplied to an input of the burner unit 2, but as well into at least one of the cathode compartment 11 and the anode compartment 12 of the fuel cell 1.

In order to realize this, the first line a is branched preferably beyond the first heat exchanger 3 by means of a third valve 41 into a first branch a1 which leads via a fourth valve 14 into the cathode compartment 11 and via a fifth valve 15 into the anode compartment 12, and a second branch a2 which leads into the first input of the burner unit 2.

By opening the third valve 41 for the first branch a1 and the fourth and/or the fifth valve 14, 15 by means of the electronic control unit 6, small amounts of air (i.e. oxygen) are supplied to the cathode compartment 11 and/or the anode compartment 12 of the fuel cell 1. Preferably, the fourth valve 14 is opened, when the temperature in the cathode compartment 11 has reached a certain predetermined medium temperature, for example about 50° C. below the steady state temperature or the lower operational temperature of the fuel cell 1. The fifth valve 15 is opened when the temperature in the anode compartment 12 has reached a certain predetermined medium temperature, for example as well about 50° C. below the steady state temperature or the lower operational temperature of the fuel cell 1.

Furthermore, these valves 14, 15 are preferably controlled such that the temperature gradients within the fuel cell 1 between the anode and the cathode compartment 12, 11 are at a minimum.

As mentioned above, by this additional feeding of air during the second or intermediate start phase of the starting procedure (which air is compressed in the compressor 52 of the turbine unit 5 and heated within the first heat exchanger 3), into the fuel cell 1, the starting procedure is accelerated, so that the steady state operation can be reached much quicker.

The reason is that an exothermic reaction with fuel will start at the cathode and in the primary catalytic layer at the anode of the fuel cell 1. Due to this fact, the air can be supplied to both the cathode and the anode compartment 11, 12, and unwanted temperature gradients above a predetermined threshold can be avoided.

The temperature within the fuel cell 1 can further be controlled by opening an inlet valve at the fuel cell 1 for air or water (not indicated in FIG. 3), by which the anode compartment 12 can be cooled. The cooling water may also start endothermic reactions with the primary fuel in the first catalytic layer of the anode. Similarly, the temperature of the cathode compartment 11 can further be controlled as well by means of air or water which is supplied through a corresponding inlet valve at the fuel cell 1 (not indicated in FIG. 3) if necessary.

Figure 4:
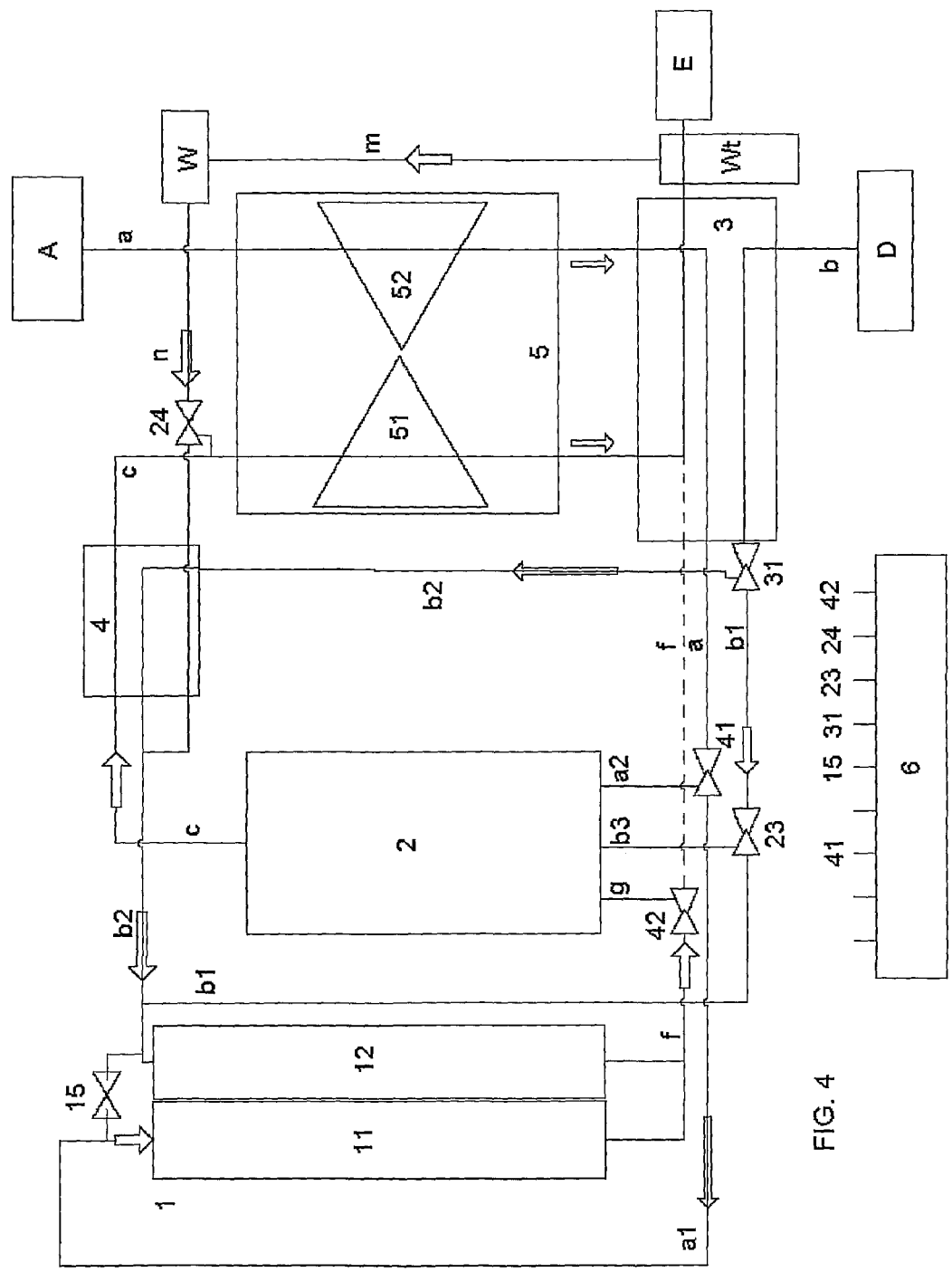
FIG. 4 a schematic block diagram of the fuel cell hybrid arrangement according to the first embodiment of the invention of FIG. 1 for conducting the method according to the invention during a steady state operation.

FIG. 4 shows a schematic block diagram of the fuel cell hybrid arrangement according to the first embodiment of the invention for explaining the steady state operation. The same units, components and lines as in the first embodiment according to FIG. 1 are again denoted with the same reference numbers and characters, respectively, so that with respect to these units, components and lines, reference is made to the above explanations.

This steady state or normal operation starts when the fuel cell 1 has reached a certain predetermined increased temperature which is usually known as the lower operational temperature which is e.g. at about 6500 C.

The output gases of the burner unit 2, which are fed through the second heat exchanger 4 for releasing heat and through the expander 51 of the turbine unit 5, are during the steady state operation supplied via the first heat exchanger 3 (for releasing heat) to the exhaust E instead of to the input of the cathode and anode compartment 11, 12. For the sake of clarity, a related switch-over valve has not been indicated in FIG. 4, but the related line sections c1 and c2 and the fourth line d in FIGS. 1 to 3 are omitted in FIG. 4 since they are not used during steady state operation. The same applies for the first and the second valve 21, 22 and the fifth line e which according to FIGS. 1 to 3 optionally lead the output gases of the expander 51 through the second heat exchanger 4.

According to FIG. 4, the fuel is again fed from the fuel feed D via the second line b through the first heat exchanger 3 for receiving heat. However, at the output of the first heat exchanger 3, the second line b is branched by means of a sixth valve 31 into a first branch b1 which directly leads via a seventh valve 23 into the anode compartment 12, and a second branch b2 which leads into the second heat exchanger 4 for optionally further heating-up a part of the fuel, before it is fed from the output of the second heat exchanger 4 as well into the anode compartment 12 of the fuel cell 1. This distribution of fuel between the lines b1 and b2 is conducted by controlling the sixth valve 31 in order to keep the desired operational temperature within the fuel cell 1.

Furthermore, via the seventh valve 23, a third branch b3 of the second line b is provided via which fuel can be fed into the second input of the burner unit 2 for burning it. The output gases from the burner unit 2 are fed via line c to the second heat exchanger 4 in order to heat the fuel within the second heat exchanger 4 and then into the expander 51 for driving the compressor 52. The amount of fuel fed into the burner unit 2 is controlled by operating the seventh valve 23 such that the required amount of heat for further heating-up the fuel is supplied into the second heat exchanger 4, and such that the expander 51 can be operated according to the load exerted by the compressor 52.

Finally, for the steady state operation, the fuel cell hybrid arrangement is provided with a water separator Wt preferably between the output of the first heat exchanger 3 and the exhaust E, by means of which water is separated from the output gas or a part of it which exits the burner unit 2 (after it has been fed through the second heat exchanger 4, the turbine unit 5 and the first heat exchanger 3). The amount of water which is separated depends especially on the output temperature of the exhaust gas stream.

From the water separator Wt the water is supplied via a ninth line m to a water tank W from which the water is a fed via a tenth line n and through an eighth valve 24 preferably into the second heat exchanger 4 so that it is heated up and supplied mainly in the form of water steam together with the fuel via the branch line b2 into the anode compartment 12 of the fuel cell 1. However, because fuel does not necessarily need to be fed in the branch line b2, this branch line b2 can also fed steam only from the tenth line n (in this case the sixth valve 31 shuts down the line b2 thereby avoiding that fuel is supplied to the fuel cell 1 via the line b2). Alternatively, the tenth line n could be fed directly into the branch line b2 (not indicated) so that the second heat exchanger 4 would be circumvented.

At least a part of the water from the water tank W can as well be fed back by accordingly controlling the eighth valve 24 via the third line c, the expander 51 and the first heat exchanger 3 into the water separator Wt.

The air is again supplied from the air feed A and fed through the compressor 52 of the turbine unit 5, and then fed through and heated within the first heat exchanger 3 by means of the output gases of the expander 51. At the output of the first heat exchanger 3, the first line a is again branched by means of the third valve 41 into the first branch a1 leading directly into the cathode compartment 11 and via the fifth valve 15 into the anode compartment 12, and the second branch a2 which is fed into the first input of the burner unit 2.

By this configuration, via the branch line b2 water or water steam and/or fuel and, by opening the fifth valve 15, air can still be supplied to the anode compartment 12, if an internal reforming of the fuel at the anode is to be achieved.

Finally, the output gases of the cathode compartment 11 and the anode compartment 12 of the fuel cell 1 are preferably supplied via a ninth valve 42 and an eleventh line g into the third input of the burner unit 2 for burning, i.e. oxidizing any non-reacted compounds of these gases, together with the fuel and the air (oxygen) which are optionally supplied via the second and the first input, respectively, into the burner unit 2. However, alternatively or additionally, these output gases can as well be fed to the exhaust E according to FIGS. 1 to 3 via the related section of the sixth line f (indicated as a dotted line in FIG. 4) beyond the ninth valve 42.

Again, the electronic control unit 6 for switching or operating the related valves is indicated only schematically, and the output terminals of the electronic control unit 6 leading to the related valves are each indicated with the reference number of the related valve.

Generally, a turbine unit 5 with an exit temperature of 200° C. or less can advantageously be installed in the fuel cell hybrid arrangement according to the invention. In this case, the efficiency of the whole arrangement can be in the range of 65% or even higher. Furthermore, with such a turbine unit 5 it is comparatively easy to manage the water balance of the whole arrangement. If some excess water is injected from the tenth line n via the eighth valve 24 and the third line c into the turbine unit 5, an even higher efficiency can be obtained.

As mentioned above, a main advantage of the method and fuel cell hybrid arrangement according to the invention is that it can be operated in such a way that during the start-up procedure power is generated without sacrificing the durability and the long-term performance of the fuel cell, especially a SOFC.

The energy source of the entire arrangement is the primary fuel for example of a vehicle (or a stationary equipment etc.) which fuel is preferably pressurized in a main tank. Pressurized air is generated in the compressor 52 of the turbine unit 5. The air can be used for controlling the temperature in the cathode compartment 11 and the anode compartment 12 of the fuel cell 1 and in the burner unit 2 which preferably is a catalytic burner unit 2.

The burner unit 2 is suitable to convert the primary fuel (if not hydrogen), nonreacted hydrogen and carbon monoxide and other reactive bi-products of the reactions occurring in the first and second catalytic layers of the anodic compartment 12 of the fuel cell 1 to CO2 and water steam for generating the hot output gases for the turbine unit 5.

The fuel cell 1 will during the steady state operation supply the burner unit 2 with hot air and hot reductants such as carbon monoxide, hydrogen and residue fuel from the output of the fuel cell 1 via the ninth valve 42 and the eleventh line g. The temperature of these hot gases and substances is close to the normal operating temperature of the fuel cell 1 of e.g. about between 650 and about 8000 C.

The heat transportation system according to FIG. 2 can also be used during the steady state operation according to FIG. 4. In this case, the hot output gases of the fuel cell 1 are preferably gas/fluid heat exchanged downstream and possibly upstream of the turbine unit 5 with the coolant medium of the heat transportation system according to FIG. 2. The coolant medium increases the temperature of the fuel cell 1 in a manner that will not compromise the durability and performance of the fuel cell 1.

The separated water stored in the water tank W can further be used to control the temperature of the fuel cell 1 by which the efficiency of the arrangement is increased due to the endothermic water/gas shift reaction of the primary fuel if it is not hydrogen.

As a result, the fuel cell hybrid arrangement according to the invention does not require a separate fuel reformer unit upstream of the fuel cell 1. By this, the complexity, the weight and the cost and volume of the fuel cell hybrid arrangement is reduced.

Furthermore, the turbine unit 5 which can be used in the fuel cell hybrid arrangement according to the invention can use high quality heat from the burner unit 2. Both the turbine unit 5 and the burner unit 2 together result in an increase of the efficiency of the fuel cell hybrid arrangement to approximately 60 to 65%, but it might be even higher if a turbine unit 5 with exhaust temperatures as low as around 2000 C is used in the fuel cell hybrid arrangement. This efficiency is substantially higher than in case of low temperature fuel cells.

The fuel cell hybrid arrangement preferably runs on DME fuel due to the fact that the reactivity of this fuel at the above temperatures is high and the fuel will not deposit soot.

DME has the advantage, that contrary to many other easily available hydrocarbons it causes no durability problems for the common Ni-based anode of the fuel cell 1. DME can be produced from natural gas and from "green" sources.

Furthermore, DME is also considerably easier to handle than hydrogen. It is nontoxic, inert, non-carcinogenic, non-mutagenic and non-corrosive, and it can be stored in the same manner as natural gas.

Another advantage of DME is that no pre-burner is needed, because the burner unit 2 between the fuel cell 1 and the turbine unit 5 can be started from ambient temperatures. Finally, the lifespan can be considerably extended, in cases where the fuel cell hybrid arrangement is subjected to frequent startup and shutdown procedures.

The above valves 21, 22, 41, 31, 23, 24 and 42 are three-way valves having one inlet and two outlets, which valves are preferably provided such that the streams of flow out of both outlets can be controlled (i.e. increased and decreased or shut down) independently from each other. The valves 14 and 15 are on/off valves having one inlet and one outlet, wherein the stream of flow out of the outlet can preferably be controlled in a continuously increasing and decreasing manner ("proportional" valve).

Generally, it is to be noted that modifications to embodiments of the invention described in the foregoing are possible without departing from the scope of the invention as defined by the accompanying claims.

Furthermore, expressions such as "including", "comprising", "incorporating", "consisting of", "have", "is" used to describe and claim the present invention are intended to be construed in a non-exclusive manner, namely allowing for items, components or elements not explicitly described also to be present.

Finally, numerals included within parentheses in the accompanying claims are intended to assist understanding of the claims and should not be construed in any way to limit subject matter claimed by these claims.

The invention claimed is:

1. Method for operating a fuel cell, comprising:
   a starting operation with a first or initial start phase during which supplied fuel is subjected to an exothermic reaction with oxygen in a burner unit and during which the fuel cell is warmed up by heat of output gases from the burner unit which are fed to the fuel cell, until the fuel cell has reached a lower operational temperature within a steady state operational temperature range, and
   a steady state operation which is initiated when the lower operational temperature is reached by terminating the feeding of output gases from the burner unit into the fuel cell and by feeding the fuel and air into the fuel cell,
   wherein the starting operation comprises a second or intermediate start phase which is initiated when the fuel cell has reached a predetermined medium temperature below the steady state operational temperature range during which second or intermediate start phase oxygen is supplied into at least one of a cathode compartment and an anode compartment of the fuel cell after the related cathode or anode compartment has reached the predetermined medium temperature.

2. Method according to claim 1, wherein during, the starting operation output gases from the burner unit are fed through an expander for driving a compressor for compressing air which is fed to the burner unit for supplying the oxygen.

3. Method according to claim 2, wherein output gases from the expander are fed through a first beat exchanger for releasing heat to the compressed air and/or the supplied fuel, and/or through a second heat exchanger for receiving heat from the output gases from the burner unit.

4. Method according to claim 3, wherein output gases from the fuel cell are fed through the first beat exchanger for releasing heat to the compressed air and/or the supplied fuel.

5. Method according to claim 3, wherein during the starting operation the fuel cell is additionally heated by means of a heat transportation system comprising a heat exchange fluid for supplying heat from the first and/or second heat exchanger into a heating chamber or compartment within or at the fuel cell.

6. Method according to claim 1, wherein the second or intermediate start phase is terminated and a steady state operation is initiated when the fuel cell has reached a predetermined increased temperature above the predetermined medium temperature but below the steady state operational temperature range or, alternatively, has reached a lower operational temperature within the steady state operational temperature range.

7. Method according to claim 6, wherein the steady state operation is initiated by feeding fuel into the anode compartment and by feeding air into the cathode compartment of the fuel cell and by terminating the feeding of output gases from the burner unit into the fuel cell.

8. Method according to claim 7, wherein the fuel supplied to the anode compartment is heated by feeding it through at least one of the first and the second heat exchanger.

9. Method according to claim 8, wherein the at least one of the first and the second heat exchanger is heated by burning fuel in the burner unit and by feeding the output gases from the burner unit through the related first and/or second heat exchanger.

10. Method according to claim 7, wherein water is separated from the output gas of the burner unit which is supplied substantially in the form of water steam into the anode compartment of the fuel cell for controlling the temperature of the fuel cell.

11. Method according, to claim 7, wherein water is separated from the output gas of the burner unit which is supplied into the expander of the turbine unit for increasing the efficiency of the turbine unit.

12. Fuel-cell hybrid arrangement comprising a fuel cell and a burner unit for burning fuel wherein the burner unit is connectable with the fuel cell for feeding heat, the fuel-cell hybrid arrangement being arranged to generate the heat by burning the fuel to the fuel cell for warming it up during a starting, operation performed according, to a method for operating the fuel cell, the method comprising:
  a starting operation with a first or initial start phase during which supplied fuel is subjected to an exothermic reaction with oxygen in the burner unit and during which the fuel cell is warmed up by heat of output gases from the burner unit which are fed to the fuel cell, until the fuel cell has reached a lower operational temperature within a steady state operational temperature range, and
  a steady state operation which is initiated when the lower operational temperature is reached by terminating the feeding of output gases from the burner unit into the fuel cell and by feeding; the fuel and air into the fuel cell,
  wherein the starting operation comprises a second or intermediate start phase which is initiated when the fuel cell has reached a predetermined medium temperature below the steady state operational temperature range during which second or intermediate start phase oxygen is supplied into at least one of a cathode compartment and an anode compartment of the fuel cell after the related cathode or anode compartment has reached the predetermined medium temperature.

13. Fuel cell hybrid arrangement according to claim 12, comprising a first line between an air supply and a first input of the burner unit for feeding air from the air supply to the first input of the burner unit, and a second line between a fuel supply and a second input of the burner unit for feeding fuel from the fuel supply to the second input of the burner unit.

14. Fuel cell hybrid arrangement according to claim 12, comprising a third and a fourth line between an output of the burner unit and the fuel cell for feeding the output gases of the burner unit into the fuel cell.

15. Fuel cell hybrid arrangement according to claim 13, comprising a first heat exchanger for heating the air and/or the fuel before it is fed into the burner unit.

16. Fuel cell hybrid arrangement according to claim 13, wherein the turbine unit comprises an expander for driving a compressor for compressing the air which is fed to the first input of the burner unit.

17. Fuel cell hybrid arrangement according to claim 16, wherein the output gases of the burner unit are fed through the expander in order to drive the compressor of the turbine unit.

18. Fuel cell hybrid arrangement according to claim 14, comprising a second heat exchanger for heating the output gases of the burner unit which are fed into the fuel cell.

19. Fuel cell hybrid arrangement according to claim 15, wherein the output gases of the fuel cell are fed through the first heat exchanger for releasing heat to the air and/or the fuel which is supplied to the burner unit.

20. Fuel cell hybrid arrangement according to claim 15, comprising a second heat exchanger for heating the output gases of the burner unit which are fed into the fuel cell, and comprising a heat transportation system with a plurality of lines for conveying a beat exchange fluid which lines are passed through the first and/or the second heat exchanger for receiving heat and which are passed through the fuel cell for releasing the heat.

21. Fuel cell hybrid arrangement according to claim 12, comprising a water separator for separating water from the output gas of the burner unit and for supplying it substantially in the form of water steam into an anode compartment of the fuel cell for controlling the temperature of the fuel cell.

22. Fuel cell hybrid arrangement according to claim 17, comprising a water separator for separating water from the output gas of the burner unit and for supplying, it into the expander.

23. Control unit for controlling a plurality of valves for controlling fuel cell hybrid arrangement according to a method according to claim 1.

24. A computer programmed with computer program code for carrying out the steps of a method according to claim 1.

25. A computer readable medium, comprising a computer program adapted to perform the steps of a method according to claim 1.

26. Control unit according to claim 23, comprising a programmable microprocessor and a computer program for controlling the plurality of valves.

27. Method according to claim 1, wherein output gases from the burner unit are used to generate electric power by a turbine unit for use by an electric beating unit during the starting operation.

* * * * *